Jan. 26, 1932. H. L. NELMS ET AL 1,842,561
CAMERA
Original Filed Aug. 22, 1927

INVENTORS
Homer L. Nelms
James A. Glenn
By
ATTORNEY

Patented Jan. 26, 1932

1,842,561

UNITED STATES PATENT OFFICE

HOMER L. NELMS, OF ALBANY, AND JAMES A. GLENN, OF MENANDS, NEW YORK

CAMERA

Application filed August 22, 1927, Serial No. 214,742. Renewed September 14, 1931.

Our invention relates to cameras and particularly to a device of this character adapted for use in clinical work.

There is at present, so far as we are aware, no camera which is adapted for conveniently making a photographic record of the progress of a surgical operation or a record of the pathological conditions discovered in any given case.

Among the features which are highly desirable, if not necessary, in such an apparatus, is that it must be capable of photographing objects lying in a horizontal plane. An ordinary camera might, of course, be held with its axis vertical and directly over a patient on the operating table, but the difficulty of focusing in this position and the danger of infecting the patient are too great to permit of such use. It is desirable that as small a portion of the apparatus as possible be directly over the object photographed. Furthermore such a camera must be adapted to quickly and accurately bring such objects into proper focus, and in connection with this particular feature should be adapted to be readily and accurately adjusted at any angle or in any position.

While the ordinary camera may be adapted for taking photographs of objects remote from the normal field of the lens by placing a right angle prism in front of the lens, the "negatives" which are produced by such procedure are in fact "positives" and the image thereon is "erect" so that prints made therefrom in the ordinary way, are reversed or inverted. Prints showing the object photographed, in its proper position, may be made from such a negative by placing the side of the plate or film which carries the emulsion upwards, or away from the sensitized paper. A print made in this way, however, is not clear cut because the markings upon the plate or negative which cast shadows upon the sensitized paper are somewhat removed from the plane of the paper so that there is a leakage of light between the negative markings and the sensitized paper.

It is quite desirable that prints should not only show the object in its proper position but should also give an accurate, sharply defined image. For this reason, it is desirable that the rays of light after passing through the prism and the ordinary lenses of the camera should again be reversed so that not only plates but films either in roll or pack form may be used.

The objects of our invention, therefore, are to provide a camera which is adapted to produce a "negative" of objects remote from the normal field of the camera lens, and from which proper, sharply defined, positive prints may be made. Another object is to provide a device of this character which is not only adapted for photographing objects remote from the normal field of the lens, but which may be used for taking photographs in the ordinary way. Another object is to provide a device of this character which may not only be raised and lowered by minute increments, but which may also be positively tipped or turned in a plurality of directions and through minute angles to facilitate focusing upon an object in any position.

With these objects in view our invention includes the novel elements and the combinations and arrangements thereof described below and illustrated in the accompanying drawings in which—

Figures 2, 4:
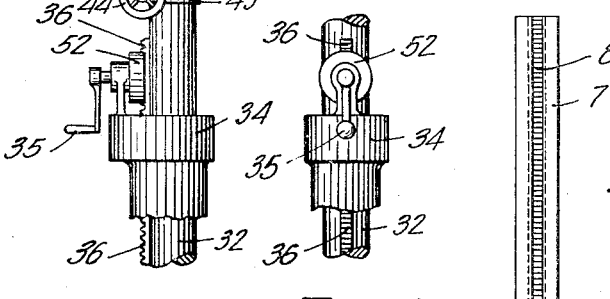
Fig. 2 is a bottom view of the focusing rack.
Fig. 4 is a fragmentary view of the elevating mechanism taken at right angles to the position shown in Fig. 1.
Figure 3:
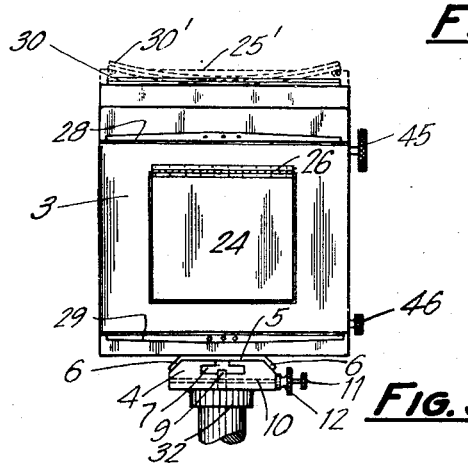
Fig. 3 is a rear view of the camera.

Referring to the drawings, our camera comprises the usual lens, 1, which is understood to be equipped with the usual shutter and diaphragm and the operating and adjusting mechanisms therefor, which parts are not shown in the drawings. The usual bellows, 2, is provided so that the distance between the lens and the focusing screen or plate may be readily varied. The bellows, 2, is connected to a dark chamber or camera box proper, 3, which is slidably mounted upon the support, 4. The bottom of the camera box is provided with a plate, 5, having depending portions, 6, at each side which fit over the beveled edges of the bed or support, 4. Attached to the plate, 5, is an inverted T bar, 7, which fits slidably within a complementary recess in the bed, 4. The center bottom of the T bar, 7, is provided with a rack 8, (see Fig. 2), and a pinion, 9, journaled in the support, 4, engages this rack. The pinion, 9, is keyed or pinned to shaft, 10, and may be turned by thumb screw, 11. When the thumb screw, 11, is turned the pinion rotates, and, coacting with the rack, 8, moves the camera box, 3, back and forth upon the support so that it may be properly focused. When the proper focus has been attained the camera may be locked in this position by means of lock screw, 12.

Within the camera box, 3, and preferably disposed at an angle of forty-five degrees to the axis of the lens is a diaphragm, 13, having a central opening, 14, permitting the pencil of rays from the lens to pass therethrough to a translucent, focusing screen, 15, in the rear of the camera box. Hingedly mounted within the camera box, and upon an axis, 51, quite close to and parallel with the diaphragm, 14, and running transversely of the camera box, is a reflecting element or mirror, 16. This mirror is normally held upwardly in the position shown by the dotted lines, 16', and against the sloping partition or diaphragm, 17, by means of the tension spring, 18. When the reflecting element, 16, is in its normal position, 16', the camera is substantially of the ordinary type and may be used in the same way and for the same purposes as any other camera. The element, 16, is adapted, however, to be swung downwardly about the axis, 51, and to be secured in light-tight contact with diaphragm, 13, by means of spring latch, 19.

Figure 1:
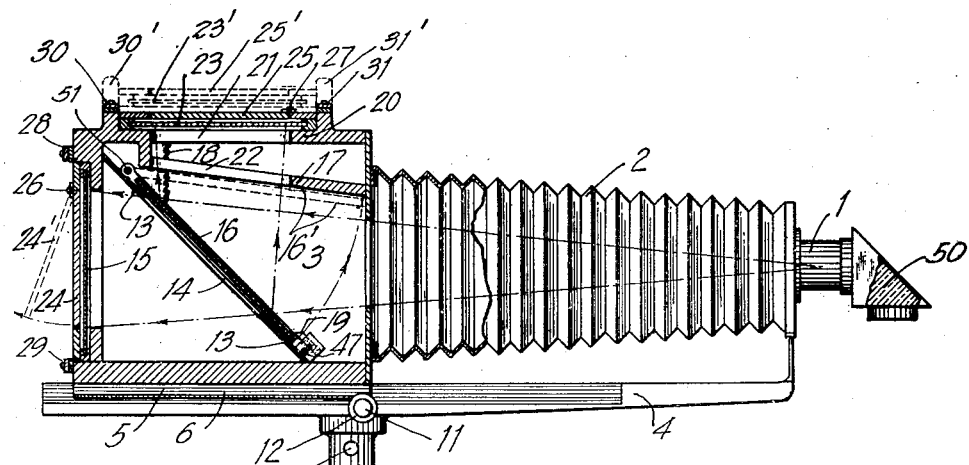
Fig. 1 is a side elevation of our camera with portions thereof removed to show the interior construction.

When it is desired to photograph some portion of a patient undergoing an operation on the table, a reflecting element, 50, preferably a right angle prism, is attached in front of the lens, as shown in Fig. 1. Such an element is adapted to reflect to the lens, rays from an object remote from the normal field thereof, and in connection with the lens, to project an erect image of the object into the camera box. For reasons above stated, this object image should be reversed or inverted before it is projected on a sensitized plate, and appropriate modifications in the ordinary camera construction are necessary.

The top of the camera box, 20, and the partition or diaphragm, 17, are provided with openings, 21 and 22, respectively, and the opening, 22, is normally rendered light-tight by the element, 16, which is held against the partition, 17, by spring, 18. At the top of the camera box, a second focusing screen, 23, may be provided which is spaced from the reflecting element, 16, when in its latched position exactly as the focusing screen, 15, is spaced therefrom. In this way, the image of the object, when in proper focus, will appear on the screen, 23, by reflection from element, 16, exactly as it appears by direct projection on the screen, 15, except that the image on the screen, 15, will be erect while the image on the screen, 23, will be inverted. Hence, either screen may be used for focusing, and to facilitate this operation, the screens, 15 and 23, may be provided with focusing hoods, 24 and 25, respectively, which are hinged at, 26 and 27, respectively, and adapted to be swung about the hinges, as shown at, 24', to uncover the translucent focusing screens.

The focusing screens, 15 and 23, together with their covering are held in light-tight contact with the camera box by means of the flat springs, 28 and 29, and 30 and 31, respectively. Each of the screens, 15 and 23, together with their hoods may be sprung away from the camera box as is well understood in the art, and as shown at, 25', to permit the insertion between the screen and the camera box of a plate holder or film pack. The sensitized surface of the plate when inserted either in the rear or top of the camera should lie substantially in the same plane as the focusing screen which it replaces.

In the drawings, the focusing screens are shown as rectangularly disposed and this is the proper relation when the reflecting element, 16, is inclined at forty-five degrees to the lens axis. When the screens are disposed so that the dihedral angle between differs from ninety degrees the reflecting element, when in latched position should lie in the plane bisecting the dihedral angle, and not at an angle of forty-five degrees, as shown.

The support, 4, is pivotally mounted on the staff, 32, and may be locked in any position by means of the screw, 33. The camera may be raised or lowered relative to a fixed support, 34, by means of crank, 35, which turns a spiral cam, 52, coacting with the rack, 36, on staff, 32.

In order that the camera may be tilted both backwardly and forwardly, and to either side, we provide two pivoted joints, 37 and 38, at right angles to each other, which are located in the staff between the fixed support, 34, and support, 4. Both of these joints are similar and consist, for example, of a tongue, 39, which is pivoted between the bifurcated portions, 40, of the staff.

In order to provide a positive and comparatively precise tilting of the camera, one side of each of the joints is provided with a sector, 41 or 41', lying in a plane perpendicular to the pivot, and the other side of the joint is provided with a worm, 42, journaled in a band, 43 or 43', which embraces the staff and which may be operated by the hand wheel, 44 or 44', respectively.

Assuming that the patient to be photographed is lying horizontally upon an operating table, the camera is moved close to the table so that the reflecting element in front of the lens is approximately in the proper position. The mirror may be assumed to be in a position, 16′, so that the object image can be quickly focused on the screen, 15, by means of the focusing screw, 11. If the image is not exactly as desired, the camera may be raised or lowered by means of the crank, 35, tilted forwardly or backwardly by means of hand wheel, 44, or to either side by the lower hand wheel, 44′. When the image upon the screen, 15, has been brought to proper position and focus, the shutter is closed and the mirror or reflecting element, 16, is lowered upon the diaphragm, 13, by means of the thumb screw, 45, until it is engaged and secured by the latch, 19. A plate holder carrying a sensitized plate is then inserted in the top of the camera by springing the screen, 23, upwardly, as shown at 23′, and the exposure is made in the usual manner. The mirror, 16, may then be released from the latch, 19, by means of the thumb screw, 46, which coacts therewith through shaft, 47, and the camera is again ready for focusing.

When it is desired to take photographs in the ordinary way the reflecting element in front of the lens may be removed and the focusing done upon either screen. In this case, instead of inserting the sensitized plate in the top of the camera it is inserted in the back by springing the focusing screen, 15, and its cover outwardly against the resistance of springs, 28 and 29, so that a plate holder or film pack may be inserted in the space formerly occupied by the screen.

While we have described our invention in its preferred embodiment it is to be understood that the words which we have used are words of description rather than of limitation and that changes within the purview of the appended claims may be made without departing from the true scope and spirit of our invention in its broadest aspects.

What we claim is—

1. In a clinical camera for photographing a patient in reclining position, the combination with an objective lens and a reflecting element adapting said camera to photograph an object remote from the normal field of said lens, of means for projecting the object image produced by said lens and element in inverted position on a sensitized plate.

2. In a clinical camera for photographing a patient in reclining position, the combination with an objective lens of a reflecting element arranged to reflect to said lens rays from an object remote from the normal field thereof, a focusing screen in said camera arranged to receive an erect image of said object thereon, and means for reflecting an inverted object image to a sensitized plate angularly disposed to the focusing screen.

3. In a clinical camera for photographing a patient in reclining position, the combination with an objective lens and a reflecting element arranged to directly project an erect image of the object being photographed upon a screen placed normal to the axis of the lens, of means for reversing the image before projecting it on a sensitized plate.

4. In a clinical camera for photographing a patient in reclining position, the combination with an objective lens of a reflecting element exterior of the camera and adapted to present an inverted object image to said lens, a focusing screen in the rear of said camera arranged to receive an erect image of the object being photographed, and a movable reflecting element adapted to be interposed between the screen and lens for reflecting an inverted image of the object on a sensitized plate.

5. In a clinical camera for photographing a patient in reclining position, the combination with an objective lens and a prism arranged to reflect rays to said lens from an object to be photographed and which is remote from the normal field thereof, of a focusing screen, and a movable reflecting element adapted to form a light-tight cut off between said lens and screen and reflect the image of the object in proper focus on a sensitized plate angularly disposed to the focusing screen.

6. In a clinical camera for photographing a patient in reclining position, the combination with a lens, of a right angle prism mounted in front of said lens and arranged to reflect thereto rays from an object remote from the normal field thereof, a focusing screen in the rear of said camera, means for holding a sensitized plate in a position angularly disposed to said screen, and a hinged reflecting element normally covering said sensitized plate but adapted to be swung to lie in the plane bisecting the dihedral angle formed by the screen and plate; whereby an inverted object image is projected on the sensitized plate.

7. In a clinical camera for photographing a patient in reclining position, the combination with an objective lens, of means for presenting an inverted object image to said lens whereby an erect object image is projected into the camera, and means for inverting the projected image to produce a normal negative.

8. In a camera, an objective lens, means associated therewith adapting said camera to photograph an object remote from the normal field of said lens, and means for projecting the object image produced by said lens in inverted position on a sensitized element.

9. In a camera, the combination with an objective lens, of a reflecting element arranged to reflect to said lens light rays from an object remote from the normal field of said lens, a focusing screen in said camera arranged to receive an erect image of said object thereon, and means for reflecting an inverted object image to a light sensitized element angularly disposed to said focusing screen.

10. In a camera, the combination with an objective lens, of a reflecting element arranged to reflect to said lens rays from an object remote from the normal field thereof, a focusing screen in said camera arranged to receive an erect image of said object thereon, and means for reflecting an inverted object image to a sensitized plate angularly disposed to the focusing screen.

HOMER L. NELMS.
JAMES A. GLENN.